United States Patent
Fujita et al.

(10) Patent No.: US 7,243,034 B2
(45) Date of Patent: Jul. 10, 2007

(54) SENSOR DEVICE

(75) Inventors: Masahiro Fujita, Aichi (JP); Yoji Shibata, Aichi (JP)

(73) Assignee: SUNX Limited, Aichi (JP)

( * ) Notice: Subject to any disclaimer, the term of this patent is extended or adjusted under 35 U.S.C. 154(b) by 0 days.

(21) Appl. No.: 11/190,999

(22) Filed: Jul. 28, 2005

(65) Prior Publication Data

US 2006/0212240 A1   Sep. 21, 2006

(30) Foreign Application Priority Data

Mar. 18, 2005 (JP) .............................. 2005-080366
Apr. 27, 2005 (JP) .............................. 2005-129972

(51) Int. Cl.
*G01R 13/02* (2006.01)

(52) U.S. Cl. ........................................ 702/68; 702/128

(58) Field of Classification Search ................... 702/68
See application file for complete search history.

(56) References Cited

U.S. PATENT DOCUMENTS 5,513,268 A   4/1996 Bironas et al.
6,154,201 A * 11/2000 Levin et al. ................. 345/184

FOREIGN PATENT DOCUMENTS

| JP | 59-091643 | 5/1984 |
|---|---|---|
| JP | 04-088709 | 3/1992 |
| JP | 04-76003 | 7/1992 |
| JP | 2003-069407 | 3/2003 |

OTHER PUBLICATIONS

Anonymous: "FX-311(p)"[Online], XP002385639, Retrieved from the Internet: URL: www.matsushita.de/home/www/eu/download/datasheet/sensor/manual/fx311_de.pdf>[retrieved on Dec. 2002].

* cited by examiner

*Primary Examiner*—John Barlow
*Assistant Examiner*—Jonathan Moffat
(74) *Attorney, Agent, or Firm*—Wenderoth, Lind & Ponack, L.L.P.

(57) ABSTRACT

A sensor device according to the present invention has a detection mode for detecting an object W, a first setting mode for changing the output duration of an output signal, and a second setting mode for changing a light-emission period of light emitted to the object W. These modes are switchable by a mode selector switch 12. If a rotary control knob 15 is operated in the detection mode, a CPU 30 changes a setting of a threshold value in response to the operation of the rotary control knob 15 and displays the changed setting of the threshold value on a digital indicator 20. This makes it possible to accurately change settings through relatively simple operations. The rate of change may correspond to the speed of operation of the knob.

23 Claims, 9 Drawing Sheets

|  | DECISION OF good | 500 OR ABOVE |
|---|---|---|
|  | DECISION OF HARD | 50 OR BELOW |

| AMOUNT OF INCOMING LIGHT | THRESHOLD | MARGIN RATIO |
|---|---|---|
| 100 | 5 | good(999P) |
|  | 9 | good(999P) |
|  | 10 | good(999P) |
|  | 11 | good(909P) |
|  | 19 | good(526P) |
|  | 20 | good(500P) |
|  | 21 | 476P |
|  | 48 | 208P |
|  | 49 | 204P |
|  | 50 | 200P |
|  | 51 | 196P |
|  | 90 | 111P |
|  | 91 | 110P |
|  | 92 | 109P |
|  | 93 | 108P |
|  | 94 | 106P |
|  | 95 | 105P |
|  | 96 | 104P |
|  | 97 | 103P |
|  | 98 | 102P |
|  | 99 | 101P |
|  | 100 | 100P |
|  | 101 | 99P |
|  | 102 | 98P |
|  | 103 | 97P |
|  | 104 | 96P |
|  | 105 | 95P |
|  | 106 | 94P |
|  | 107 | 93P |
|  | 108 | 93P |
|  | 109 | 92P |
|  | 110 | 91P |
|  | 111 | 90P |
|  | 499 | HARD(20P) |
|  | 500 | HARD(20P) |
|  | 501 | HARD(20P) |
|  | 999 | HARD(10P) |
|  | 1000 | HARD(10P) |
|  | 1001 | HARD(10P) |
|  | 1002 | HARD(10P) |
|  | 1999 | HARD(5P) |
|  | 2000 | HARD(5P) |
|  | 2001 | HARD(5P) |
|  | 4000 | HARD(3P) |

※ MARGIN RATIOS IN PARENTHESES ARE NOT DISPLAYED

SENSOR DEVICE

BACKGROUND OF THE INVENTION

1. Field of the Invention

The present invention relates to a sensor device with an improved method for setting a threshold value.

2. Description of the Prior Art

Conventionally, sensor devices are known that are capable of detecting the presence or absence of bodies, etc. They detect the presence or absence of a body, etc. by comparing a detection signal, outputted according to the detection state of an object, with a predetermined threshold value.

Such sensor devices are configured to allow changes in the settings, such as threshold values. As a setting change device, for example, some sensor devices are equipped with multiple buttons for use in changing the settings. Pressing the buttons can change a threshold displayed on a digital indicator. This allows an operator to accurately set the threshold value while looking at the digital indicator.

For example, as disclosed in Japanese Utility Model No. 4-76003, there is a sensor device that is equipped with a rotatable input element, such as a variable resistor. This element allows the operator to change a setting by rotating the variable resistor to a desired position while looking at a graduated scale. The rotatable input element makes it possible to set a threshold value through a simpler operation than the pushing of buttons.

Generally, sensor devices allow the operator to set not only the threshold value, which is the detection sensitivity, but also various values related to other various functions, including the timing and output duration of a signal outputted from the sensor device and the light-emission period of a photoelectric sensor. With a type of sensor in which settings are changed by pressing buttons, settings are made in each of these various functions by switching among the operation modes of the buttons. This makes it difficult for an operator to see at a glance how to change a desired setting, causing the inconvenience of having to operate the buttons while keeping an operations manual at hand.

Also, to change a threshold by 10 steps for example, a setting button must be pressed 10 times. This is troublesome. Generally, the operator tends to press a button faster corresponding to increases in the total number of times he/she must press the button. Consequently, the operator may often press a button for an incorrect number of times. If, for example, the button is mistakenly pressed for an additional 10 times, the threshold value is changed too much and must be returned to a predetermined value (in this case corresponding to 10 more button pressings). This complicates the task of setting the threshold value.

On the other hand, it is easy to understand the operating method (setting method) when changing a setting by rotating a variable resistor to a specific scale position. However, it is difficult to make an accurate setting because the visually determined scale position (setting) has an unavoidable difference from the actual setting.

The present invention has been made in view of the above circumstances and has as an object to provide a sensor device that allows settings to be accurately changed through relatively simple operations.

SUMMARY OF THE INVENTION

To achieve the above object, the present invention provides a sensor device that operates based on predetermined conditions comprising: a control knob capable of analog operation; a value-setting unit that changes the settings of the predetermined conditions in response to the operation of the control knob; a digital display unit; and a display control unit that displays the settings changed by the value-setting unit on the digital display unit.

The "predetermined conditions" may include for example; detection sensitivity of the sensor device, timing and duration of a signal outputted from the sensor device, and a light-emission period of a photoelectric sensor. On the other hand, the "settings" may include a threshold value if the given "condition" is detection sensitivity, or include an extension time if the given "condition" is output duration. Furthermore, the "analog operation" includes continuous operation in a predetermined direction where the setting can be continuously varied according to the direction and amount of operation. In that case, preferably the control knob is a rotary control knob that can be rotated.

DETAILED DESCRIPTION OF THE PREFERRED EMBODIMENTS

A first embodiment of the present invention will be described with reference to FIGS. 1 to 4.

1. Structure of a Sensor Device

A fiber sensor 1, a first embodiment of the sensor device according to the present invention, detects the presence or absence of an object W by comparing the level of a detection signal (corresponding to the amount of received light) with a threshold value. The fiber sensor 1 has a rectangular body case 10 containing a CPU 30, etc. described later. Although not shown in the figures, there is a jack located on the front surface of the body case 10 in order to plug in a fiber cable used to emit and receive light. Also not shown, an electric wire exits out from a rear surface of the rectangular body case 10.

Figure 1:
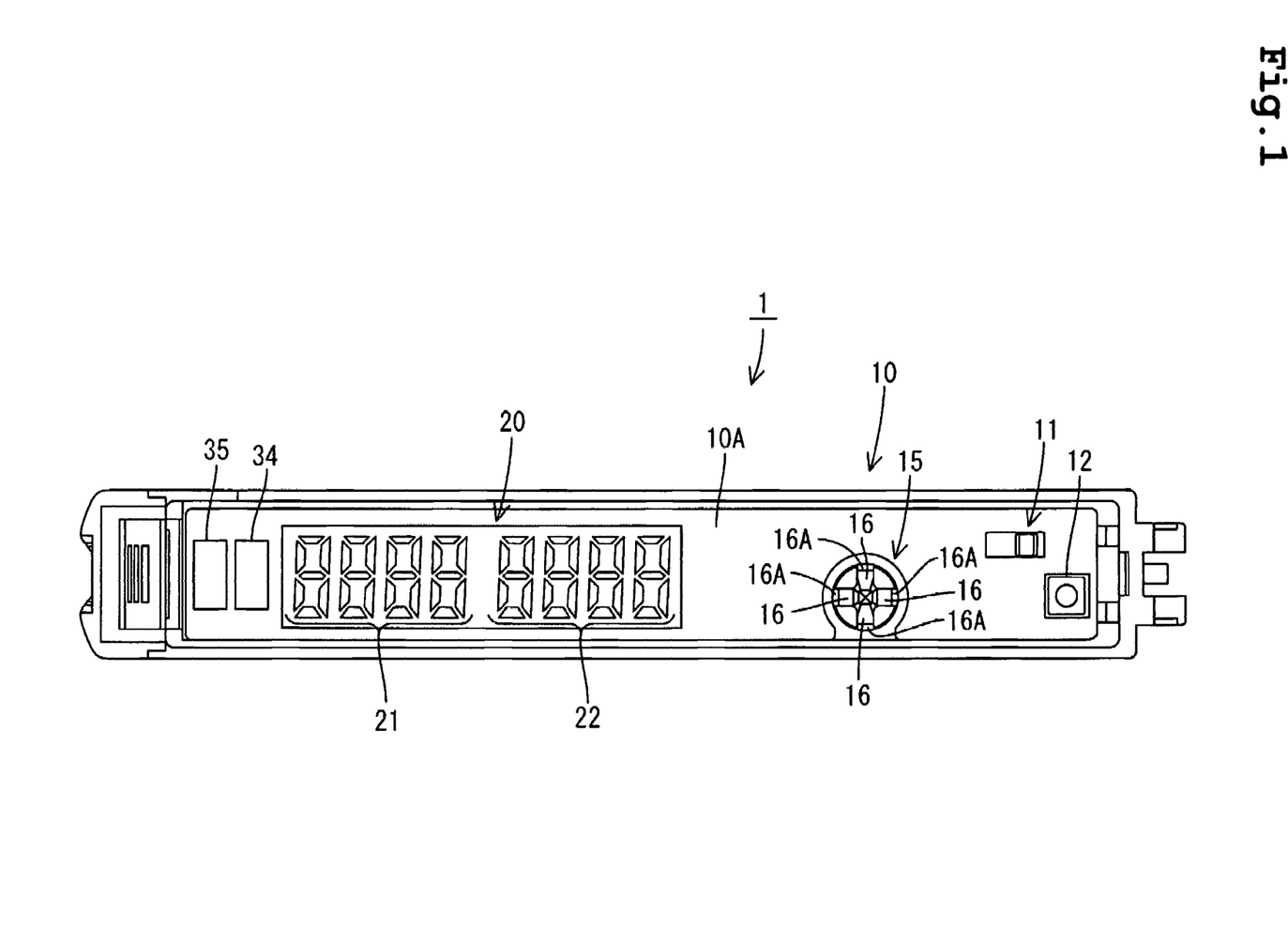
FIG. 1 is a top view of a fiber sensor according to a first embodiment.

As shown in FIG. 1, there are an L/D switch 11, a mode selector switch 12, a rotary control knob 15, and a digital indicator 20, located on a top surface 10A of the body case 10.

The L/D switch 11 is slidable to the left and right. When moved in one direction, the L/D switch 11 is set to determine that an object W has been detected if a detected amount of received light is larger than a threshold value (Light ON).

When moved in the other direction, the L/D switch 11 is set to determine that an object W has been detected if a detected amount of received light is smaller than the threshold value (Dark ON). In this embodiment, it is assumed that the L/D switch 11 is set to determine that an object W has been detected if the detected amount of received light is larger than the threshold value (Light ON).

The mode selector switch 12 can be switched among a detection mode, a first setting mode, and a second setting mode, but the switch 12 is initially set to the detection mode. Beginning with the detection mode, each time the mode selector switch 12 is pressed and held for a predetermined time, the mode selector switch 12 sends a switch signal to the CPU 30. This causes the CPU 30 (which corresponds to a value-setting unit according to the present invention) to toggle among the first setting mode, the second setting mode, and the detection mode. The fiber sensor 1 is designed to automatically return to the detection mode if the mode selector switch 12 is not pressed for more than another predetermined amount of time in the first setting mode or the second setting mode. Therefore, the fiber sensor 1 is normally in the detection mode.

The detection mode is a mode in which objects W can be detected. In the detection mode, the digital indicator 20 displays a threshold (setting) value used as a reference for comparison with the detection signal level. The threshold display changes as the rotary control knob 15 is rotated, allowing the adjustment of the detection sensitivity.

Figure 4:
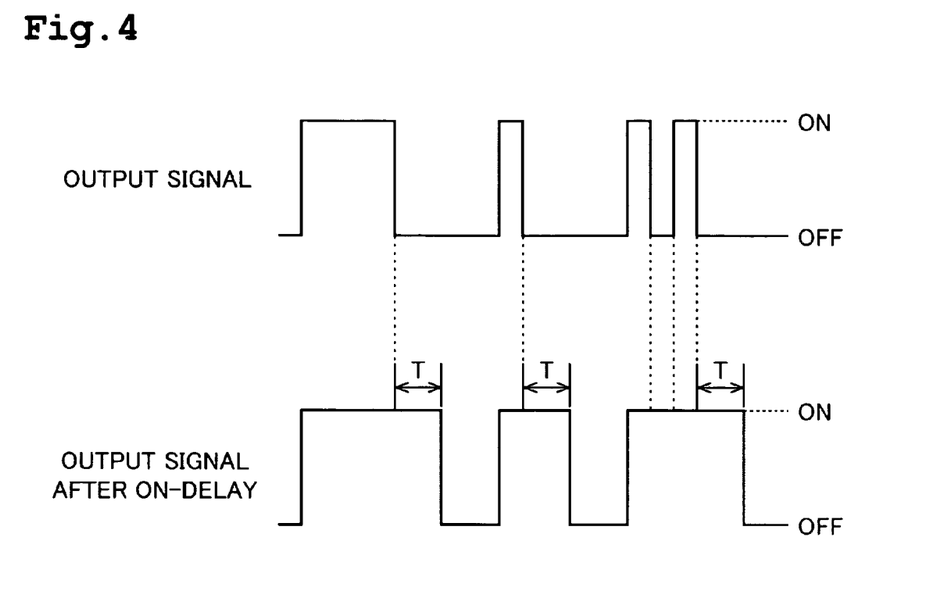
FIG. 4 is a diagram illustrating an extended pulse width of an output signal.

The first setting mode is the mode selected when no detection operation is to be performed (e.g., before the shipment of the product). In this mode, the digital indicator 20 displays the timing and output duration of an output signal, thereby allowing them to be changed by rotating the rotary control knob 15. As an example of a change in the output duration, the pulse width of the output signal (pulse signal) from the CPU 30 is extended by a predetermined time period T (ON-delay) as shown in FIG. 4. As a result, even if an object W is small and the normal output duration (pulse width) of the output signal is not sufficiently long enough to detect the object W, it is still possible to detect the object W by extending the output duration (pulse width).

The second setting mode is a mode selected when no detection operation is performed (e.g., before the shipment of the product) as with the case of the first setting mode. In the second setting mode, the digital indicator 20 displays the light-emission period of the light emitted from a light-emitting element. This allows the light-emission period to be changed by rotating the rotary control knob 15 (e.g., regarding settings of the light-emission period, three periods may be stored in advance and rotating the rotary control knob 15 toggles among the various periods). Consequently, the predetermined conditions according to the present invention are the sensitivity, which can be adjusted, the light-emission period, which can be varied, and the output signal, which can also be varied.

The overall shape of the rotary control knob 15 is cylindrical with the top end protruding from the top surface 10A of the body case 10. The rotary control knob 15 can rotate in a desired direction (clockwise or counterclockwise) about a rotational axis for an unlimited number of turns.

Figure 3:
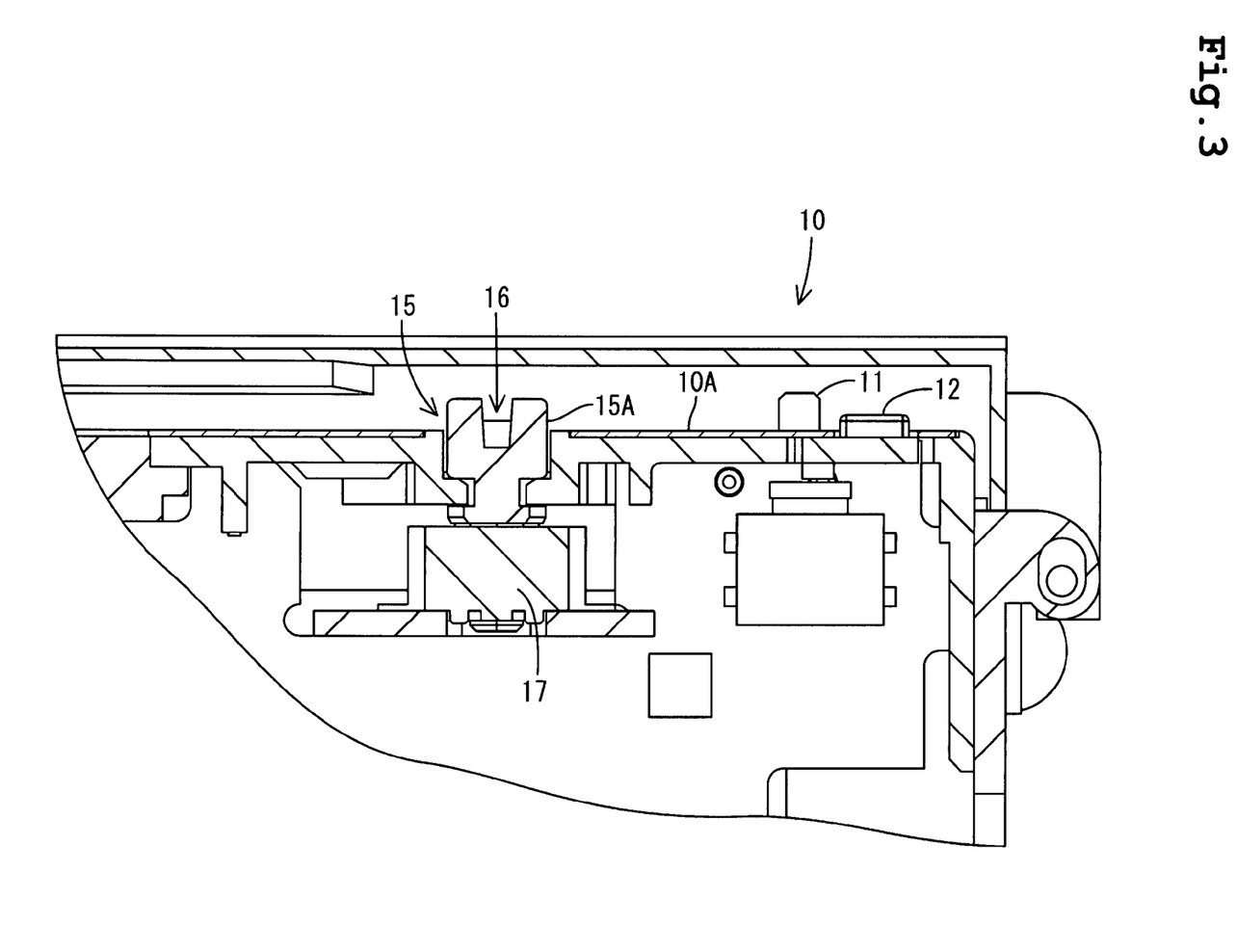
FIG. 3 is a partial sectional side view of the fiber sensor.

Two orthogonal grooves 16 are provided at the approximate center in a surface (e.g., the top face) of the rotary control knob 15, as shown in FIG. 1. The terminations 16A (both ends) of each groove 16 reach (i.e., penetrate) the circumferential surface 15A of the rotary control knob 15 as shown in FIG. 3. The terminations 16A are exposed above the top surface 10A of the body case 10. Consequently, even if the rotary control knob 15 is small, a tool (e.g., a Phillips-head screw driver or flat bladed screw driver) larger than the rotary control knob 15 can be engaged with the grooves 16 in such a way as to extend beyond the circumferential surface 15A (via terminations 16A of the grooves 16) of the rotary control knob 15. This makes it possible to rotate the rotary control knob 15 with a relatively large tool.

By rotating the rotary control knob 15, various settings are changed depending on the respective modes: the threshold value (detection mode), the output duration of the output signal (first setting mode), and the light-emission period (second setting mode), etc.

The rotary control knob 15 has a rotational axis (not shown) extended downward (into the body case 10). A rotary encoder (hereinafter referred to as the encoder 17, see FIG. 3) is connected to the rotational axis (not shown). As the rotary control knob 15 is rotated, two different phased pulse signals—phase A and phase B—are outputted from the encoder 17 to the CPU 30. Upon receiving the pulse signals, the CPU 30 detects the rotational speed (operating speed) of the rotary control knob 15 based upon the number of triggers detected in the pulse signals. The CPU 30 changes the threshold value (detection sensitivity) by an amount corresponding to the detected rotational speed. Thus, the CPU 30 corresponds to the "speed detecting section" according to the present invention.

Specifically, a predetermined time period t, used as a reference for the trigger intervals, is stored in memory. When a trigger interval T1, inputted to the CPU 30, is shorter than the predetermined time period t (i.e., T1<t; indicating coarse adjustment through the use of high-speed rotation of the rotary control knob 15), the CPU 30 varies the setting by 1 each time a predetermined number of triggers N are detected (i.e., meaning that the rotary control knob 15 has been rotated by a predetermined angle θ). On the other hand, when the trigger interval T1 is longer than the predetermined time t (T1>t; indicating fine adjustment through the use of low-speed rotation of the rotary control knob 15), the CPU 30 varies the setting by 1 each time a multiple of the predetermined number of triggers N (e.g., 4N) are detected (i.e., meaning that the rotary control knob 15 has been rotated by an angle of 4θ). Incidentally, the rotational direction of the rotary control knob 15 is determined based upon the phase—phase A or phase B—of the pulse signal whose triggers (i.e., rises and falls) are initially detected by the CPU 30. For example, rotating the rotary control knob 15 clockwise may increase the setting value and rotating the rotary control knob 15 counterclockwise may decrease the setting value.

When the number of triggers in the inputted pulse signal exceeds some other predetermined number (i.e., indicating that the rotation of the rotary control knob 15 has exceeded a predetermined range), the CPU 30 no longer varies the setting value (the CPU 30 maintains a constant setting), ignoring the excess triggers. Consequently, the digital indicator 20 only displays numeric values in a predetermined range (e.g., a first display section 21 can display only numeric values from 1 to 4000). This prevents the operator from wrongly accepting an incorrect setting value, which would be the case if the value displayed on the digital indicator 20 differed from the actual setting when the rotary control knob 15 is rotated beyond the predetermined range.

As shown in FIG. 1, the digital indicator 20 (which corresponds to the "digital indicator" according to the present invention) is approximately provided on the left half of the top surface 10A of the body case 10. The digital indicator 20 has a pair of display sections: a first display section 21 on the left and a second display section 22 on the right. For example, each display section may consist of a 4-digit, 7-segment LED display.

The first display section 21 displays the setting value in each mode (the threshold value in the detection mode, the extension time T [s] of the output duration of the output signal in the first setting mode, and the light-emission period [s] in the second setting mode). The second display section 22 displays a received light level in the detection mode, and a symbol for the current mode in the first setting mode and second setting mode (e.g., DELY in the first setting mode and SPED in the second setting mode).

The first display section 21 and second display section 22 may have different display colors.

Specifically, for example, the first display section 21 may display the green light of green LEDs and the second display section 22 may display the red light of red LEDs. This allows the operator to readily recognize which of the two display sections is indicating the threshold value.

Furthermore, a pair of indicator lamps are provided at the left end of the body case 10 (i.e., to the left of the digital indicator 20 in FIG. 1): an operation indicator lamp 34 on the left and an operational stability indicator lamp 35 on the right.

The operation indicator lamp 34 illuminates when an object W is detected, but remains off if no object W is detected. The operation indicator lamp 34 makes it possible to visually identify whether an object W has been detected.

The operational stability indicator lamp 35 illuminates when an object W is stably detected. Specifically, a shift level for shifting the threshold value to a stable level (which allows an object W to be stably detected) is stored in the memory (not shown) in advance. If the level of the detection signal outputted from a light-receiving circuit 32 is higher than the stable level, the operational stability indicator lamp 35 illuminates, indicating that the object W is detected with a high degree of accuracy. As a result, the operational stability indicator lamp 35 allows the operator to visually identify whether the detection or the non-detection of an object W is in a stable state.

2. Electrical Configuration of the Sensor Device

Figure 2:
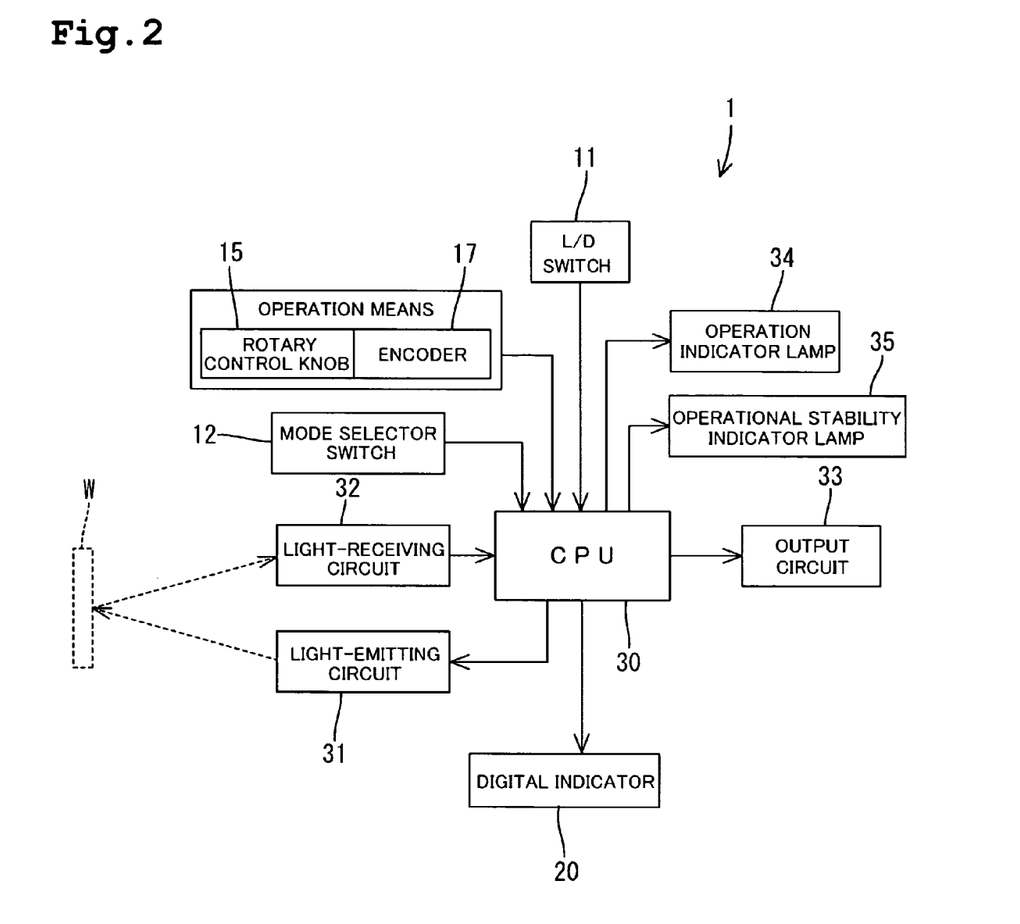
FIG. 2 is a block diagram showing an electrical configuration of the fiber sensor.

FIG. 2 is a schematic circuit diagram of the fiber sensor 1. In the figure, reference numeral 30 denotes the CPU.

The CPU 30 is connected to the L/D switch 11 and the mode selector switch 12. Each time the CPU 30 receives a switch signal from the mode selector switch 12, the CPU 30 toggles among the detection mode (which is the default), the first setting mode, and the second setting mode.

Also, the CPU 30 is connected with the encoder 17. When the rotary control knob 15 is rotated, the CPU 30 receives a pulse signal from the encoder 17. The CPU 30 may measure the number of trigger signals and the trigger intervals T1 of the trigger signals. The trigger signals may be the rises and falls of the pulse signal.

The CPU 30 compares the measured trigger interval T1 with the predetermined time period t stored in memory. If the trigger interval T1 is shorter than the predetermined time period t, the CPU 30 may change the setting in the current mode by 1 for each time that a trigger is detected. On the other hand, if the trigger interval T1 is longer than the predetermined time t, the CPU 30 may change the setting in the current mode by 1 for each time that four triggers are detected (e.g., a 4 times larger rotational angle).

The CPU 30 is connected to the digital indicator 20. The CPU 30 displays the changed setting on the first display section 21 each time that the setting is changed. Therefore, the CPU 30 corresponds to the "display control unit" according to the present invention.

Also, the CPU 30 is connected with a light-emitting circuit 31 equipped with a light-emitting element (light-emitting section) and a light-receiving circuit 32 equipped with a light-receiving element (light-receiving section). The CPU 30 causes the light-emitting element to periodically emit light based upon a predetermined time period stored in the light-emitting circuit 31. The CPU 30 receives a detection signal from the light-receiving circuit 32 (which corresponds to the "detection signal output section" according to the present invention) corresponding with the level of light reflected by an object W and received by the light-receiving element (light-receiving section) from the emitted light.

Upon receiving the detection signal from the light-receiving circuit 32, the CPU 30 displays the level of the detection signal on the second display section of the digital indicator 20. The CPU 30 the next ends the pulse width (output duration) of the detection signal by the preset extension time T (if any), and compares the level of the detection signal with the preset threshold value. If the level of the detection signal exceeds the preset threshold value, the CPU 30 may determine that an object W has been detected. The CPU 30 may then output the decision as an output signal to an output circuit 33, and illuminate the operation indicator lamp 34. Thus, the CPU 30 corresponds to the "first comparison section, detection section, and output section," according to the present invention.

The CPU 30 also compares the level of the extended detection signal with the stable level to which the threshold value has been shifted (increased). If the level of the detection signal exceeds the stable level, the CPU 30 illuminates the operational stability indicator lamp 35. Thus, the CPU 30 also corresponds to the "second comparison section" according to the present invention.

3. Advantages of the First Embodiment

According to this embodiment, settings changed by the rotary control knob 15 (control knob), with an operation method that is relatively easy and simple to understand, are displayed on the digital indicator 20 (digital indicator). This makes it possible to readily recognize the settings (with a high degree of accuracy).

Also, since there is no limit to the number of turns or rotations of the rotary control knob 15, it may be possible to avoid breakage problems that are otherwise associated with rotary knobs having a limit to the number of turns.

Furthermore, when the operating speed of the rotary control knob 15 is varied, the setting of the detection sensitivity is changed at a rate corresponding to the operating speed. This makes it relatively easy to quickly change the setting of the detection sensitivity.

According to this embodiment, the setting of the threshold can be changed using the rotary control knob 15 in the detection mode in which objects W can be detected. Settings other than the threshold value, i.e., the settings of the light-emission period and the output signal duration, can be changed using the rotary control knob 15 in the setting modes in which no object W is detected. This reduces the need to switch to another mode in a detection mode in which the detection sensitivity is frequently changed.

If the duration of the output signal needs to be changed to accommodate the conditions under which objects W are detected (e.g., if there is not enough time for detection due to the slow response times of the connected equipment) this embodiment allows setting changes (extension) of the output duration of the output signal, making it possible to detect objects W under a variety of conditions and configurations.

If there are multiple display sections, one showing a threshold value and the other showing something other than the threshold value, it may be difficult to identify the threshold value. Since the display section that displays the threshold value has a different display color than the other display section, the threshold value can be readily recognized with a configuration of this embodiment.

Second Embodiment

A second embodiment of the present invention will now be described with reference to FIGS. 5 and 6. The same components as those of the first embodiment will be denoted by the same reference numerals as the corresponding components of the first embodiment. Descriptions of the same components may be omitted.

Whereas in the first embodiment, the threshold value and the level of the detection signal are respectively displayed in the first display section 21 and second display section 22 of the digital indicator 20, in the second embodiment, a relative value between the threshold value and the level of the detection signal (hereinafter referred to as the "margin ratio") is displayed in the first display section 21 and the rotational angle of the rotary control knob 15 is displayed in the second display section 22. Incidentally, the margin ratio displayed in the first display section 21 is the ratio (relative value) of the detection signal level to the threshold value. The margin ratio is expressed as follows: margin ratio (%)=(detection signal level)/threshold value×100.

The CPU 30 calculates the margin ratio from the preset threshold value and the detection signal level received from the light-receiving circuit 32. The CPU 30 uses the above formula and displays the calculated margin ratio in the first display section 21. The margin ratio may be displayed numerically using the first three digits of the 4-digit first display section 21. A symbol P may be displayed as the last digit, indicating that the displayed numeric value represents the margin ratio. This makes it relatively easy for the operator to adjust the sensitivity settings, since the sensitivity (threshold) can be set by adjusting the corresponding margin ratio. For example, the margin ratio can be adjusted to 200% as a basis.

Figure 5:
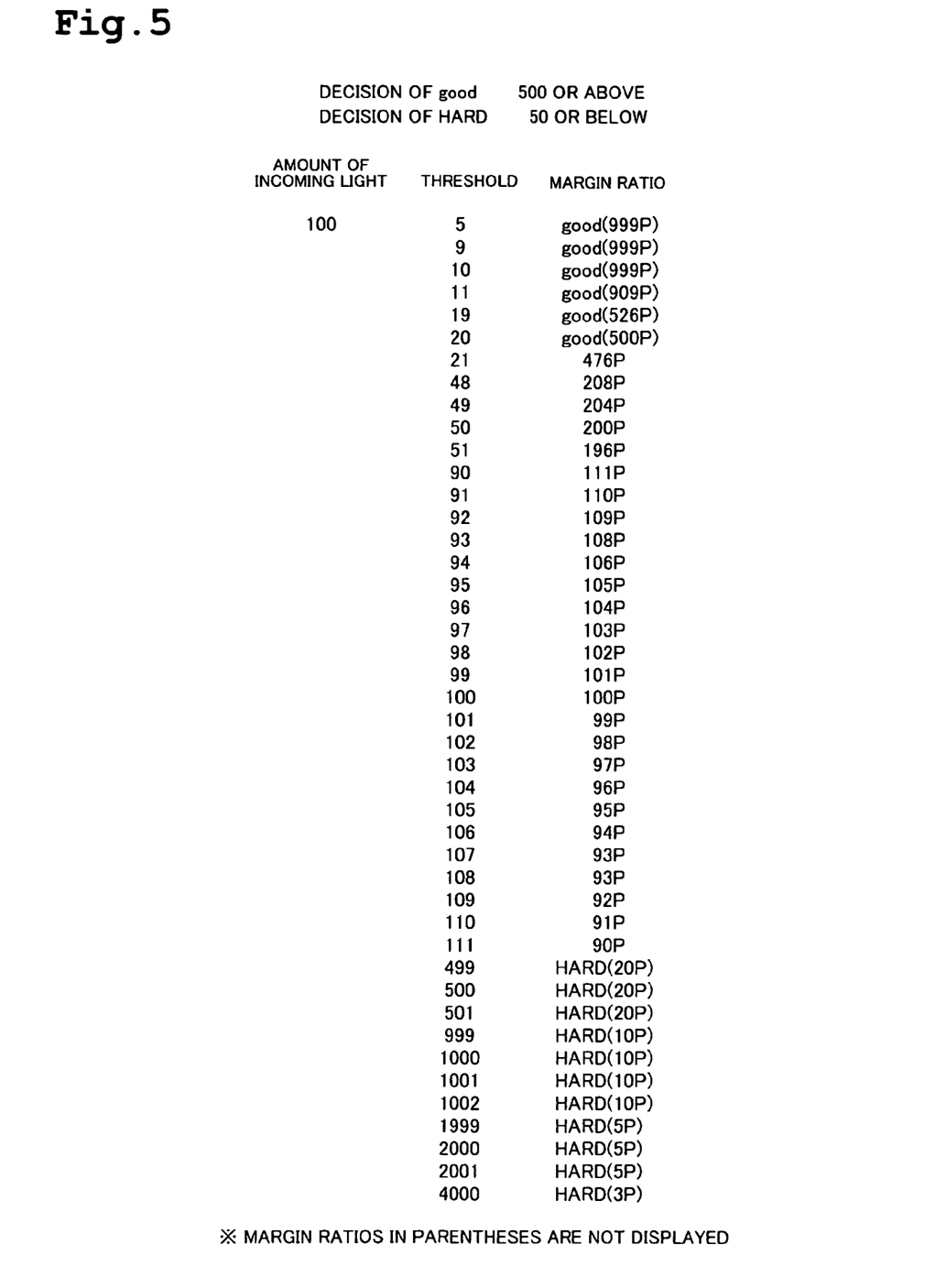
FIG. 5 is a diagram showing a relationship between a threshold and margin ratio.
Figure 6:
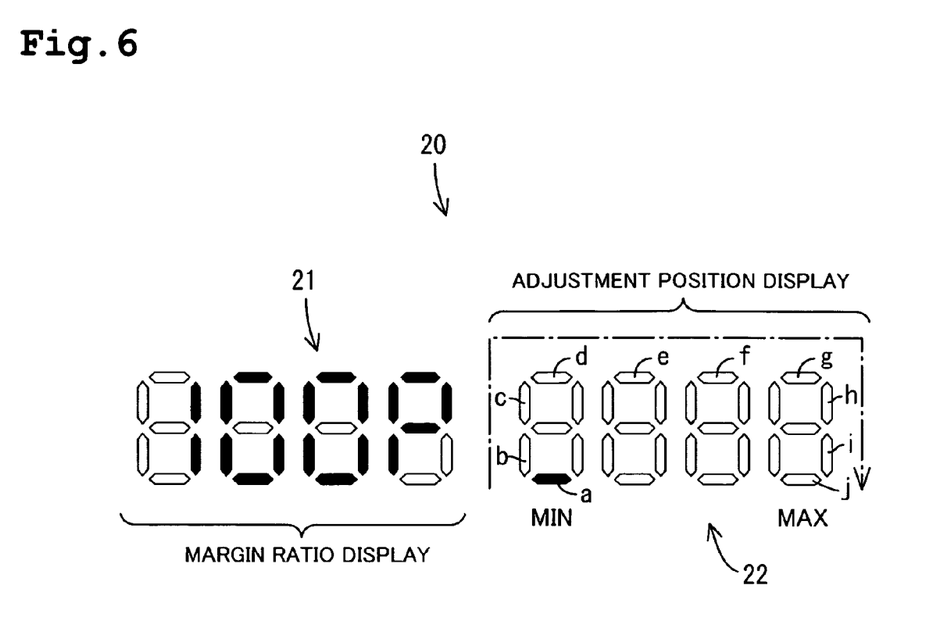
FIG. 6 is a diagram showing a display on a digital indicator according to a second embodiment.

Incidentally, since the margin ratio is displayed as a relative value (in percentages), as shown in FIG. 5, the margin ratio changes approximately in inverse proportion to changes in the threshold value when the margin ratio is around 100%. However, the amounts of change in the threshold value and the margin ratio are no longer inversely proportional as the margin ratio departs from 100%. As shown in FIG. 5, with decreases in the threshold value the change in the margin ratio becomes larger than the change in the threshold value (upper part of FIG. 5). With increases in the threshold value the change in the margin ratio becomes smaller than the change in the threshold value (lower part of FIG. 5).

Consequently, when the operator rotates the rotary control knob 15 in order to set a predetermined margin ratio, the large difference between the amount of rotation of the rotary control knob 15 (i.e., the amount of change in the threshold value) and the corresponding amount of change in the margin ratio may confuse the operator. To accommodate this situation, when the margin ratio is higher than a predetermined level an indication that the margin ratio is out of a predetermined range is displayed (e.g., "good" when the margin ratio is too high and "HARD" when the margin ratio is too low, as shown in FIG. 5) instead of displaying the numeric value and symbol P of the margin ratio on the first display section 21. As a result, this helps to prevent the operator from being confused about the margin ratio display.

When the first display section 21 displays the margin ratio, the amount of rotation of the rotary control knob 15 is unknown, although a relative relationship between the detection signal level and the threshold value can be seen. For example, if the rotary control knob has a limited number of turns, it is not known how many turns have already been made and how many turns may still be available.

According to the second embodiment, the second display section 22 displays an adjustment position of the rotary control knob 15. Specifically, as shown in FIG. 6, the second display section 22 illuminates segments in a predetermined order (e.g., following the arrow in FIG. 6 in the order from a to j) to indicate to the operator the relative number of turns (angle) of the rotary control knob 15 through the position of the illuminated segments (e.g., or the number of illuminated segments).

In this way, according to the second embodiment, the operator can not only easily set the sensitivity level (i.e., visually see a relationship between the threshold value and the detection signal level) by looking at the margin ratio (the relative value between the threshold value and detection signal level) displayed in the first display section 21, but the operator can also see the operational range of the rotary control knob 15 by looking at the information displayed in the second display section 22 (indicating the operation position of the rotary control knob 15).

Generally, when two variables that differ in a direction of operation are displayed side by side (generally, rotation in the direction of increasing the threshold value (clockwise rotation) may decrease sensitivity, but when the sensitivity is manipulated directly, clockwise rotation may increase the sensitivity), it may be difficult to visually identify which variable is which. Consequently, the operator may get confused about which operation method to perform. However, according to the second embodiment if a clockwise rotation is set to increase the margin ratio, as is generally accepted, the operator can easily recognize the correct direction of operation. Also, the symbol P that indicates the margin ratio makes it easier for the operator to recognize the margin ratio.

Third Embodiment

Figure 7:
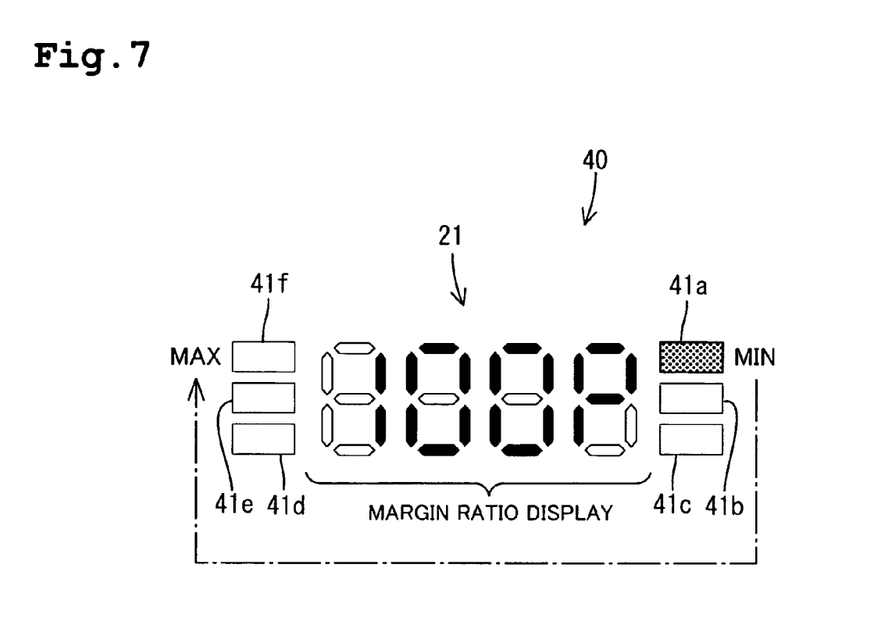
FIG. 7 is a diagram showing a display on a digital indicator according to a third embodiment.

A third embodiment of the present invention will now be described with reference to FIG. 7.

Whereas the digital indicator 20 is equipped with a first display section 21 and a second display section 22 according to the second embodiment, according to the third embodiment a digital indicator 40 is equipped with six adjustment position indicator lamps 41 (41a to 41f). The adjustment position indicator lamps may indicate the operation position of the rotary control knob 15, instead of using the second display section 22 as in the second embodiment.

Two sets of three adjustment position indicator lamps 41 are arranged vertically to the left and right of the first display section 21. The position of illuminated indicator lamps (e.g., or the number of illuminated indicator lamps) may advance (increase) in the direction of the arrow (41a→41f) in FIG. 7 corresponding to the rotational angle (i.e., number of turns) of the rotary control knob 15.

This allows the operator to know the margin ratio from the first display section 21, and also know the relative number of turns (rotational angle) of the rotary control knob 15 from the number of illuminated adjustment position indicator lamps (or the position of illuminated adjustment position indicator lamps).

It is to be understood that the number of illuminated adjustment position indicator lamps is not limited to six, and may be more than or less than six.

Fourth Embodiment

A fourth embodiment of the present invention will now be described with reference to FIGS. 8A, 8B, and 9.

According to the first embodiment, when changing the setting of the threshold value, the rate of change is varied corresponding to the rotational speed of the rotary control knob 15. Specifically, for the same total angle of rotation (i.e., the amount of operation in the direction of rotation) of the rotary control knob 15, the setting of the threshold may be changed by a relatively large amount (by 1 each time N triggers are detected) when there is a relatively high rotational speed of the rotary control knob 15. Conversely, the setting of the threshold may be changed by a relatively small amount (by ¼ each time N triggers are detected) when there is a relatively low rotational speed of the rotary control knob 15.

The fourth embodiment is the same as the first embodiment in that the rate of change may be varied when adjusting the setting of the threshold value, but the fourth embodiment differs in the variation method. According to the fourth embodiment, a rotary control knob 55 may have two operating patterns: a first operating pattern in which the rotary control knob 55 is only rotated, as in the case of the first embodiment, and a second operating pattern in which an operation in the direction of rotation and another operation are performed in combination with one another. The rate of change may be varied according to these operating patterns.

According to this embodiment, the rotary control knob 55 can move up and down (along) an axial direction of the knob. The other operation as described above consists of an axial pushing operation.

Figure 8A:
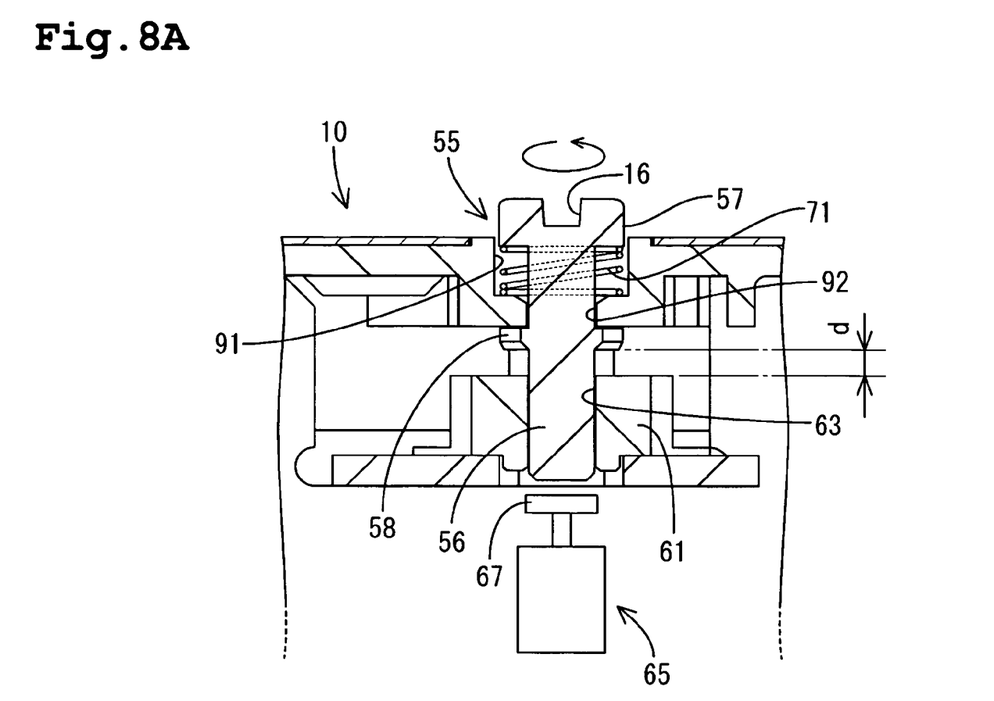
FIGS. 8A and 8B are sectional views showing a supporting structure of a rotary control knob according to a fourth embodiment.
Figure 8B:
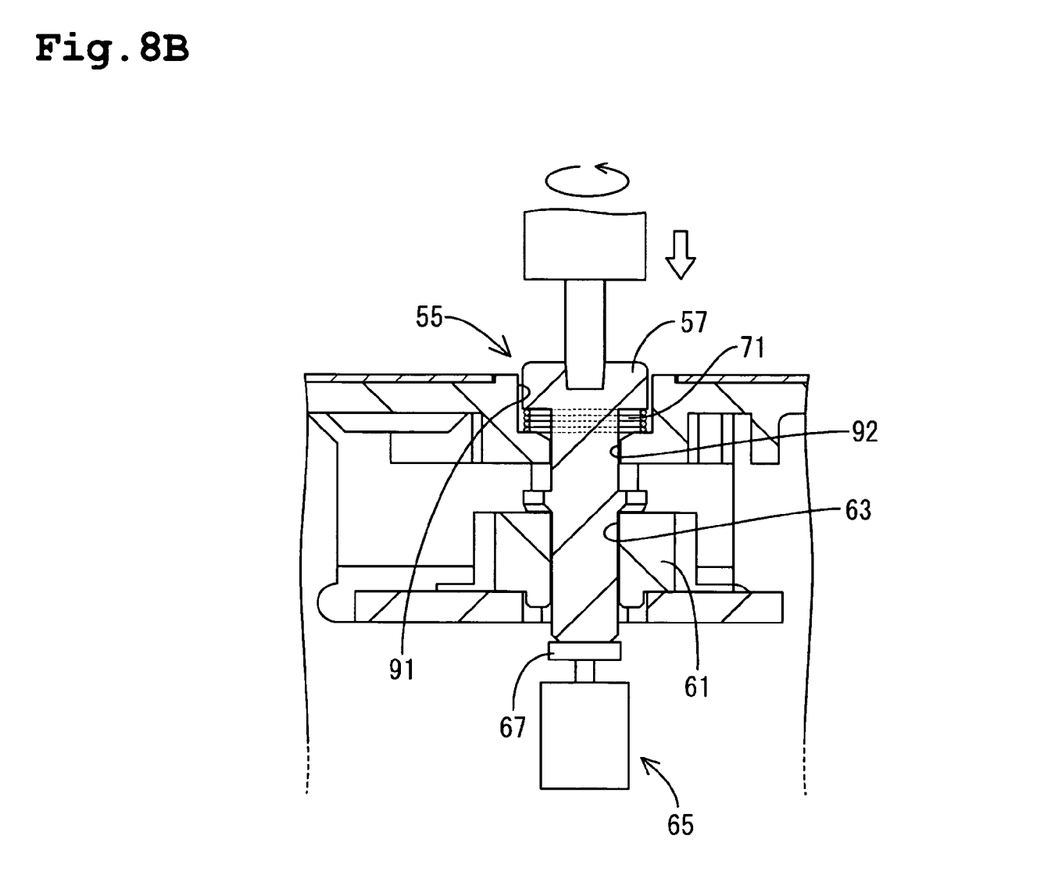
Figure 9:
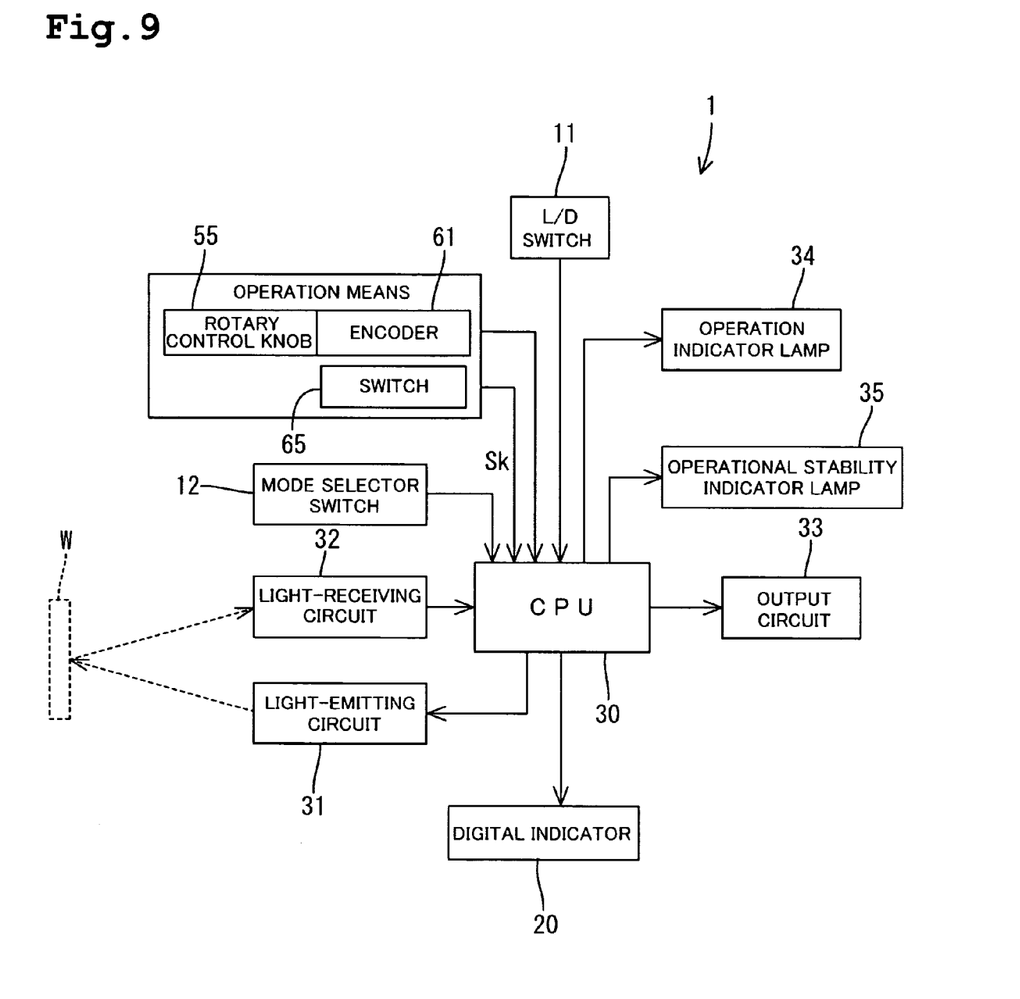
FIG. 9 is a block diagram showing an electrical configuration of the fiber sensor.

More specifically, a seat 91 is provided in the form of a depression formed in the top wall of the body case 10 (as shown in FIGS. 8A and 8B) to support the rotary control knob 55. A shaft hole 92 is formed in the center of the seat 91. The rotary control knob 55 consists of a tubular shank 56 (which corresponds to the "shaft" according to the present invention) extending vertically. A flange 57, enabling the rotating operation, is provided on the top end of the tubular shank 56. Incidentally, grooves 16 are provided in the top surface of the flange 57 as in the case of the first embodiment.

There is a slight clearance between the shank 56 of the rotary control knob 55 and the shaft hole 92 in the seat 91. The rotary control knob 55 is rotatably supported on the seat 91.

Near the center of the shank 56, in a longitudinal direction, a retainer plate 58 protrudes outward from the outer circumference of the shank 56. The retainer plate 58 abuts against the underside of the seat 91 in order to prevent the rotary control knob 55 from inadvertent removal. As shown in FIG. 8A, a clearance d is provided between the underside of the retainer plate 58 and the top surface of the rotary encoder 61 (described later). Consequently, the rotary control knob 55 can move up and down in an axial direction (along the axis of the shank 56) for a distance corresponding to the clearance d.

A coil spring 71 (which corresponds to the "urging device" according to the present invention) is provided in the seat 91 to urge the rotary control knob 55 upward. As a result, the rotary control knob 55 is constantly urged upward.

Since the rotary control knob 55 is capable of rotation on the shank 56 and linear travel in the axial direction, the configuration lends itself to a first operation pattern in which the rotary control knob 55 is only rotated about a fixed position as shown in FIG. 8A, and a second operation pattern in which the rotary control knob 55 is not only rotated on the shank 56, but also simultaneously pushed in an axial direction, as shown in FIG. 8B.

The rotating operation about the axis corresponds to the primary operation method according to the present invention. The push operation in the axial direction corresponds to the secondary operation method according to the present invention.

According to the fourth embodiment, the amount of rotation of the rotary control knob 55 is detected by the rotary encoder 61 as in the case of the first embodiment. The rotary encoder 61 is rotatably supported under the seat 91 in the body case 10. A shaft hole 63 is formed vertically through the center of the rotary encoder 61 and the tip of the shank 56 of the rotary control knob 55 is passed through it. Consequently, when the rotary control knob 55 is rotated, the rotary encoder 61 rotates together with the rotary control knob 55.

A push button switch 65 is installed below the rotary encoder 61, facing the tip of the shank 56. The pushbutton switch 65 is an operation pattern detection switch. It is turned on when the second operation pattern is activated, and allows a detection signal Sk to be sent to the CPU 30.

Specifically, when the rotary control knob 55 is not depressed, i.e., in the state shown in FIG. 8A, the operation pattern detection switch 65 has a slight clearance between itself and the tip of the shank 56. Therefore, the operation pattern detection switch may remain OFF. When the rotary control knob 55 is pushed along the axis, an end face of the shank 56 is pushed downward and subsequently turns on a detection section 67, as shown in FIG. 8A. The operation pattern detection switch 65 continues to output a detection signal Sk until the upward movement of the shank 56 turns the detection signal OFF.

The fiber sensor has a memory (not shown) that may store two rate-of-change setting patterns. The first rate-of-change setting pattern is a fine-adjustment pattern. According to the fine-adjustment pattern, the threshold is changed by ¼ each time N triggers are detected in the pulse signal outputted from the rotary encoder 61. The second rate-of-change setting pattern is a coarse-adjustment pattern. According to the coarse-adjustment pattern, the threshold is changed by 1 each time N triggers are detected in the pulse signal outputted from the rotary encoder 61.

The CPU 30 changes the rate-of-change setting pattern read out of memory corresponding to the presence or absence of the detection signal Sk. Specifically, when the operation pattern detection switch 65 does not output a detection signal Sk, the rate of change is set by reading the fine-adjustment pattern out of memory. However, once a detection signal Sk is outputted, the rate of change is set by reading the coarse-adjustment pattern out of memory for as long as the detection signal Sk is being outputted.

In this way, according to this embodiment, the rate of change in the setting (threshold) can be varied depending on the operation pattern, making it easy to change the threshold value. That is, if it is desired to finely adjust the threshold value, the operation pattern with the smaller rate of change can be used. If it is desired to change the threshold value by a large amount, the operation pattern with the larger rate of change can be selected.

According to this embodiment, the second operation pattern uses a combination of two operations, both of which are operations relative to the axis. Namely, they are a rotating operation about the shank 56, and a pushing operation along the shank 56. This combination of two operations, which are related to each other and that can be easily linked together, makes it possible to maintain good operability in the second operation pattern as well in the first operation pattern. Furthermore, according to this embodiment, since fine adjustments (small amounts of change) can be made by only rotating the rotary control knob 55, the operator can easily concentrate on accurately changing the threshold value.

Generally, to adjust the setting to a predetermined value, the setting is altered by large amounts (coarse adjustment) in the initial stages of adjustment. The setting is altered by small amounts in the final stages (fine adjustment).

In a configuration according to this embodiment, the rotary control knob 55 is constantly urged (biased) by the coil spring 71. Thus, during coarse adjustment, if the axial pressing force is relaxed the rotary control knob 55 automatically returns to its original state from a depressed state, switching to fine adjustment. In this way, no special switching mechanism is required to switch from coarse adjustment to fine adjustment. This helps to provide a good level of operability.

Other Embodiments

The present invention is not limited to the above description and the embodiments described with reference to the drawings. For example, embodiments such as those described below are also included within the technical scope of the present invention.

(1) Although the digital indicator 20 displays the threshold value and detection signal levels in the first embodiment and the digital indicator 20 displays a relative value between the threshold and detection signal level in a separate embodiment, this is not restrictive. For example, the digital indicator 20 may display the threshold value and the relative value between the threshold value and the detection signal level or it may display the detection signal level and the relative value between the threshold value and the detection signal level.

(2) Although in the above embodiments, the encoder 17 is used for the control knob, this is not restrictive. For example, it is alternatively possible to use a multi-rotation trimmer that contains a gear mechanism and in which 10 to 20 rotations of a shaft may cause a slider to move from 0% to 100%; or a single-rotation trimmer in which a single rotation of a shaft rotates a gear in a gear mechanism by a predetermined angle, causing a slider to move. Furthermore, a slide switch may change the setting instead of a rotary control knob. Also, for example, a rotary BCD switch (thumb rotary switch) that displays numeric values when a dial is rotated may be used as the control knob.

(3) Although in the above embodiments, the sensitivity is adjusted by varying the threshold value, this is not restrictive. For example, the sensitivity may be adjusted by increasing and decreasing the amount of light emitted from the light-emitting element, or by varying the amount of amplification of light received by the light-receiving element.

(4) Although in the above embodiments, the ON time (pulse width) of the pulse signal is extended by a predetermined time period T (ON-delay), this is not restrictive. The OFF time (pulse interval) of the pulse signal may be extended by a predetermined time period (OFF-delay). Also, the ON time and OFF time of the pulse signal may be reduced by a predetermined time period.

(5) Although in the above embodiments, the mode selector switch 12 toggles among the detection mode, the first setting mode, and the second setting mode, this is not restrictive. For example, it is alternatively possible to switch between the detection mode and setting mode using the mode selector switch 12, and then switch between the first setting mode and second setting mode in the setting mode level using the mode selector switch 12 or another mode selector switch 12.

(6) Although in the fourth embodiment, the second operation pattern is a combination of a pushing operation in the axial direction and rotating operation about the axis, the second operation may be another type of operation pattern as long as it is a combination of operations. For example, it may be a combination of a rotating operation and a sliding operation.

The invention claimed is:

1. A sensor device that operates based upon predetermined conditions, comprising:
 a detection section, which comprises a light-emitting section that emits light to an object and a light-receiving section that receives the light emitted by the light-emitting section and detects the object based on the predetermined conditions;
 an output section that outputs an output signal according to results of detection;
 a control knob capable of analog operation;
 a value-setting unit that changes a settings of the predetermined conditions in response to operation of the control knob, wherein the setting is at least one of a detection sensitivity of the detection section, an output duration of the output signal outputted from the output section and a light-emission period of the light-emitting section;
 a digital indicator; and
 a display control unit that displays the settings changed by the value-setting unit on the digital indicator.

2. The sensor device according to claim 1, wherein the control knob is a rotary control knob that can be rotated.

3. The sensor device according to claim 2, wherein:
 the rotary control knob can be rotated for an unlimited number of turns; and
 when rotation of the rotary control knob exceeds a predetermined range, the value-setting unit no longer changes the settings, ignoring the rotation beyond the predetermined range.

4. The sensor device according to claim 2, wherein:
 the rotary control knob protrudes beyond a surface of a body casing;
 a groove is provided intersecting with an approximate center of a surface of the rotary control knob with a first end and a second end of the groove reaching a circumferential surface of the rotary control knob.

5. The sensor device according to claim 1, comprising a detection section that detects an object based on the predetermined conditions, wherein:
 the control knob is a rotary control knob that can be rotated.

6. The sensor device according to claim 5, further comprising:
a speed detecting section that detects an operating speed of the control knob, wherein:
the value-setting unit changes the setting by varying the detection sensitivity at a rate corresponding to the operating speed detected by the speed detecting section.

7. The sensor device according to claim 5, wherein:
the control knob has at least two operating patterns,
a first operating pattern in which only a primary operation is performed, and
a second operating pattern in which the primary operation and a secondary operation are performed in combination; and
the value-setting unit varies a rate of change according to the operating patterns when changing the setting in response to operation of the control knob.

8. The sensor device according to claim 7, wherein:
the primary operation is a rotating operation about a shaft of the control knob, and
the secondary operation is an operation along the shaft of the control knob.

9. The sensor device according to claim 8, wherein:
the secondary operation is a pushing operation along the shaft of the control knob; and
the value-setting unit sets the rate of change such that the setting is changed by a larger amount when an operation is performed according to the second operating pattern than when the operation is performed according to the first operating pattern.

10. The sensor device according to claim 9, further comprising:
an urging device that urges the control knob in a direction opposite to the push operation.

11. The sensor device according to claim 5, further comprising:
a switch capable of switching between:
a detection mode in which objects are detected, and
a setting mode in which a setting other than the detection sensitivity is changed, wherein:
the value-setting unit changes the setting of the detection sensitivity through operation of the control knob in the detection mode, and
the value-setting unit changes the setting other than the detection sensitivity through operation of the control knob in the setting mode.

12. The sensor device according to claim 11,
wherein the value-setting unit changes the setting of the output duration through operation of the control knob in the setting mode.

13. The sensor device according to claim 12, comprising an output section that outputs an output signal according to results of detection, wherein:
the switch can switch the setting mode to one of a first setting mode and a second setting mode; and
the value-setting unit changes the setting of the output duration through operation of the control knob in the first setting mode, and
the value-setting unit changes the setting of the light-emission period through operation of the control knob in the second setting mode.

14. The sensor device according to claim 11, wherein the value-setting unit changes the setting of the light-emission period through operation of the control knob in the setting mode.

15. The sensor device according to claim 11, wherein:
the detection section detects an object based on a result of the comparison made by the first comparison section; and
the sensor device comprises an operation indicator lamp that illuminates depending on the results of the comparison.

16. The sensor device according to claim 5, comprising:
a detection signal output section that outputs a detection signal at a level corresponding to a detection state of an object; and
a first comparison section that compares the level of the detection signal outputted from the detection signal output section with a threshold value, wherein
the setting of the detection sensitivity changed by the value-setting unit is the threshold value, and
the detection section detects an object based on a result of the comparison made by the first comparison section.

17. The sensor device according to claim 16, wherein the display control unit displays a relative value between the threshold value and the detection signal level outputted from the detection signal output section on the digital indicator.

18. The sensor device according to claim 17, wherein the display control unit displays the threshold value using a different display color than the other display sections.

19. The sensor device according to claim 16, wherein:
the digital indicator comprises a plurality of display sections; and
the display control unit causes the plurality of display sections to respectively display at least the threshold value and the detection signal level outputted from the detection signal output section.

20. The sensor device according to claim 16, wherein:
the digital indicator comprises a plurality of display sections; and
the display control unit causes the plurality of display sections to respectively display at least the detection signal level outputted from the detection signal output section and the relative value between the threshold value and the detection signal level.

21. The sensor device according to claim 16, wherein:
the digital indicator comprises a plurality of display sections; and
the display control unit causes the plurality of display sections to respectively display at least the relative value between the threshold value and the detection signal level outputted from the detection signal output section and information about an operation position of the control knob.

22. The sensor device according to claim 16, comprising:
a second comparison section that compares the level of the detection signal outputted from the detection signal output section with a level shifted from the threshold value by a predetermined amount; and
an operational stability indicator lamp that illuminates based on a result of the comparison made by the second comparison section.

23. The sensor device according to claim 1, wherein the digital indicator comprises at least one 7-segment LED.

* * * * *